E. ROGERS.
APPLICATOR.
APPLICATION FILED JUNE 28, 1915.
1,256,831.
Patented Feb. 19, 1918.
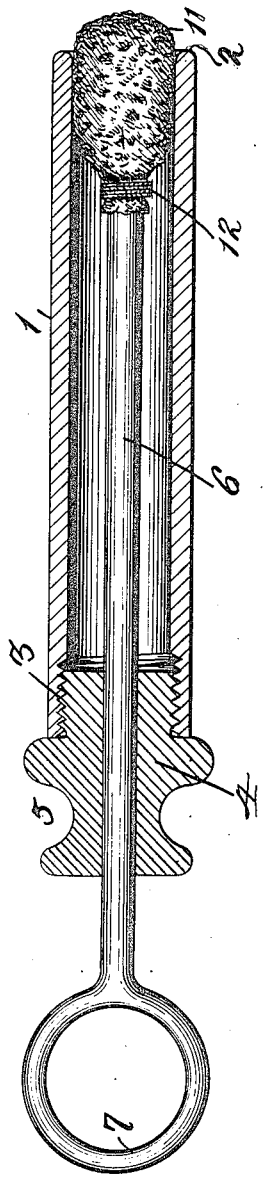
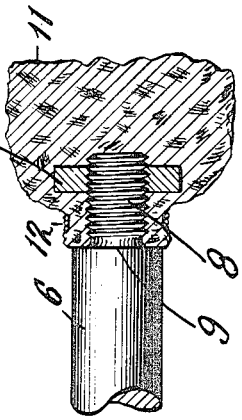
Witness
S. W. Brainard.
Inventor
Eugene Rogers
By C. E. Humphrey
Attorney

UNITED STATES PATENT OFFICE.

EUGENE ROGERS, OF BARBERTON, OHIO.

APPLICATOR.

1,256,831.  Specification of Letters Patent.  Patented Feb. 19, 1918.

Application filed June 28, 1915. Serial No. 36,717.

*To all whom it may concern:*

Be it known that I, EUGENE ROGERS, a citizen of the United States, residing at Barberton, in the county of Summit and State of Ohio, have invented new and useful Improvements in Applicators, of which the following is a specification.

This invention relates to applicators for use in cleansing or treating with medicine the inner portions of an opening in the human body, and the object of the invention is to provide a device for the purpose described which will be effectual, simple, easily operated, strong, durable and efficacious for the purpose for which it is intended.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a longitudinal sectional view of an applicator embodying my invention; and, Fig. 2, is an enlarged view partly in section and partly in side elevation showing the inner end of the device.

Referring to the drawings in detail the reference numeral 1 denotes a cylindrical tube-like barrel preferably formed of some suitable material such as hard rubber having a rounded wall 2 at the inner end and provided at its opposite end with interior threads 3. Secured in the threaded end of the barrel 1 is a closure member 4 exteriorly-threaded to mesh with the threads 3 and provided with an exterior groove 5 to constitute a grasp for the hand. This closure member 4 is provided centrally and longitudinally with an aperture constituting a bearing for an applicator-stem 6 provided at one end with a handle 7 and having a reduced threaded portion 8 at the opposite end. Between the reduced portion 8 and the balance of the stem is a shoulder 9. mounted on the threaded portion 8 is a cylindrical, relatively thin nut 10 capable of being moved toward or away from the shoulder 9 by revolving it in the proper direction. The nut 10 and the shoulder 9 form in connection with the reduced portion 8 of the stem an annular groove for a purpose to be described. Adapted to be secured on the threaded end of the stem 6 is a body or tampon 11 of absorbent material such, for instance, as cotton, lint, linen, gauze, or a piece of sponge. The absorbent material is secured in place by bringing the portions thereof over the outer face of the nut 10 into the groove before referred to, and then securing the extended-in portions by means of some flexible material such as a thread or wire constituting a collar or clamp 12 wrapped about it to closely compress the material in the groove and about the threaded portion 8. The clamp 12 is non-elastic and thus designed to resist circumferential yielding when the stem 6 is turned to draw the nut inward toward the shoulder 9 and thereby expand and tightly compress the tampon between the nut and shoulder, and insure its positive retention in place.

It will be pointed out that the body 11 of absorbent material will be of suitable size to be capable of being entirely retracted within the body of the barrel when desired and capable of being forced therefrom for use.

In use the device is inserted and the parts are treated through the application of the medicated body of absorbent material or the absorbent material may be inserted in the cavity in a dry condition for the purpose of removing surplus moisture or foreign substances.

I claim:—

1. An applicator including a stem having a reduced end portion providing a shoulder, a body of absorbent material adapted to receive and completely house said reduced portion of said stem in one end thereof, inelastic means for binding a portion of said absorbent material around and to said reduced portion, and means longitudinally movable upon said reduced portion adapted to clamp said bound portion of said absorbent material against said shoulder and force the same into positive engagement with the inelastic binding means.

2. An applicator including a stem having a reduced end portion providing a shoulder, a body of absorbent material adapted to receive and completely house said reduced portion of said stem in one end thereof, inelastic means for binding a portion of said absorbent material around and to said reduced portion, and means longitudinally movable upon said reduced portion adapted to clamp said bound portion of said absorbent material against said shoulder, said last means being completely housed within said end of said body of absorbent material and said binding means being intermediate said shoulder and said longitudinally movable means, whereby the absorbent material between the shoulder and longitudinally movable member is forced into positive engagement with the inelastic binding means.

In testimony whereof I have hereunto set my hand.

EUGENE ROGERS.